(12) United States Patent
Sedwick

(10) Patent No.: US 11,142,347 B1
(45) Date of Patent: Oct. 12, 2021

(54) SYSTEM AND METHOD FOR THE ASSEMBLY OF LARGE DISTRIBUTED STRUCTURES IN SPACE

(71) Applicant: AST&Defense, LLC, Miami, FL (US)

(72) Inventor: Raymond J. Sedwick, University Park, MD (US)

(73) Assignee: AST&Defense, LLC, Miami, FL (US)

( * ) Notice: Subject to any disclaimer, the term of this patent is extended or adjusted under 35 U.S.C. 154(b) by 0 days.

(21) Appl. No.: 16/107,591

(22) Filed: Aug. 21, 2018

Related U.S. Application Data

(60) Provisional application No. 62/671,900, filed on May 15, 2018.

(51) Int. Cl.
| | | |
|---|---|---|
| *B64G 1/10* | (2006.01) | |
| *B64G 1/28* | (2006.01) | |
| *B64G 1/32* | (2006.01) | |
| *B64G 1/64* | (2006.01) | |
| *B64G 1/36* | (2006.01) | |
| *B64G 1/24* | (2006.01) | |

(52) U.S. Cl.
CPC ............ *B64G 1/1085* (2013.01); *B64G 1/28* (2013.01); *B64G 1/32* (2013.01); *B64G 1/36* (2013.01); *B64G 1/64* (2013.01); *B64G 2001/247* (2013.01); *B64G 2700/24* (2013.01)

(58) Field of Classification Search
CPC .. B64G 1/1085; B64G 1/1007; B64G 1/1092; B64G 1/64; B64G 1/28; B64G 1/32; B64G 1/36; B64G 2700/24; B64G 2001/247

See application file for complete search history.

(56) References Cited

U.S. PATENT DOCUMENTS

| | | | | |
|---|---|---|---|---|
| 4,057,207 A | * | 11/1977 | Hogan | B64G 1/12 244/159.4 |
| 5,052,640 A | * | 10/1991 | Chang | B64G 1/002 136/292 |
| 5,386,953 A | * | 2/1995 | Stuart | B64G 1/1085 244/158.4 |
| 5,810,297 A | * | 9/1998 | Basuthakur | B64G 1/1085 244/158.8 |
| 5,911,389 A | * | 6/1999 | Drake | B64G 1/1007 244/158.4 |
| 5,957,410 A | * | 9/1999 | Bruederle | B64G 1/281 244/164 |
| 5,979,830 A | * | 11/1999 | Kellermeier | B64G 1/1085 244/158.8 |
| 6,089,510 A | | 7/2000 | Villani et al. | |
| 6,330,093 B1 | * | 12/2001 | Eller | B64G 1/10 398/164 |

(Continued)

*Primary Examiner* — Christopher D Hutchens
(74) *Attorney, Agent, or Firm* — Blank Rome LLP

(57) ABSTRACT

A system includes a satellite assembly. The assembly includes a plurality of satellite devices, where each satellite device includes a processor device, an impulse actuator, and a memory storing instructions. The instructions are executable by the processor device to access a sequence of waypoints. The sequence of waypoints identifies a first waypoint and is associated with formation of a distributed structure including the plurality of satellite devices. The instructions are further executable by the processor device to initiate movement of the satellite device toward the first waypoint at least by initiating activation of the impulse actuator.

24 Claims, 13 Drawing Sheets

(56) References Cited

U.S. PATENT DOCUMENTS

| | | | |
|---|---|---|---|
| 6,471,161 B1 * | 10/2002 | D'Ambrosio | B64G 1/32 244/164 |
| 6,568,638 B1 * | 5/2003 | Capots | B64G 1/10 244/159.4 |
| 6,634,603 B2 | 10/2003 | Cooper | |
| 6,839,520 B1 * | 1/2005 | Dreischer | H04B 10/118 398/121 |
| 6,847,867 B1 * | 1/2005 | Elliott | B64G 1/1007 342/357.32 |
| 7,464,902 B2 | 12/2008 | Leyre et al. | |
| 9,846,023 B1 | 12/2017 | Soloway | |
| 9,973,266 B1 | 5/2018 | Avellan et al. | |
| 10,023,307 B2 * | 7/2018 | Deng | B60L 1/00 |
| 2001/0035207 A1 * | 11/2001 | Mikami | B64G 1/428 244/172.7 |
| 2001/0050657 A1 * | 12/2001 | Meguro | B64G 1/222 343/915 |
| 2004/0193334 A1 * | 9/2004 | Carlsson | G05D 1/0022 701/9 |
| 2006/0016934 A1 * | 1/2006 | Sharer | B64G 1/007 244/158.4 |
| 2006/0105706 A1 * | 5/2006 | Huang | B64G 1/10 455/12.1 |
| 2007/0045474 A1 * | 3/2007 | Bae | B64G 1/1085 244/171.1 |
| 2009/0132105 A1 * | 5/2009 | Paluszek | B64G 1/26 701/13 |
| 2010/0032528 A1 * | 2/2010 | Frenkiel | G01S 13/933 244/158.4 |
| 2011/0297795 A1 * | 12/2011 | Jaeger | B64G 1/10 244/171.1 |
| 2014/0077036 A1 * | 3/2014 | Healy | B64G 1/24 244/158.8 |
| 2015/0303582 A1 * | 10/2015 | Meschini | B64G 1/222 343/840 |
| 2016/0065006 A1 * | 3/2016 | Woods | B64G 1/64 307/84 |
| 2018/0033496 A1 * | 2/2018 | Sedwick | G21B 1/15 |
| 2020/0277087 A1 * | 9/2020 | Kaen | B64G 1/242 |

* cited by examiner

SYSTEM AND METHOD FOR THE ASSEMBLY OF LARGE DISTRIBUTED STRUCTURES IN SPACE

RELATED APPLICATION

This application claims the benefit of U.S. provisional application 62/671,900, filed May 15, 2018, the entire contents of which are hereby incorporated by reference.

BACKGROUND OF THE INVENTION

Field of the Invention

The present invention relates to the assembly of distributed structures in space. A distributed structure could be any structure that includes structural elements configured to be launched to orbit in a stowed configuration that is substantially different than an eventual operating configuration, requiring a reconfiguration of the structural elements once they are in space. The utility of the present invention increases as the number of individual structural elements grows, and/or as the individual mass of the structural elements decreases.

In particular, the proposed method is well-suited for the assembly of large phased-array antennas, where each module of the array is largely similar to every other module, and contains its own power source and processing capabilities. Inter-satellite magnetic forces (Electromagnetic Formation Flight) is used to physically move the structural elements relative to one another. The invention includes the algorithmic structure and implementation that allow for robust automatic assembly of the structure.

Background of the Related Art

Current space structures are typically launched in the same configuration in which they will operate in space, except for the limited deployment of solar arrays, antennas, or booms that are already connected to the structure but folded in some way to make the stowed configuration more compact to fit within a launch vehicle shroud.

Objects such as phased array antennas increase their utility with regard to gain and power availability as they become larger. Very large phased array antennas have application to ground communication, deep space communication, signal detection, power beaming and radar.

However, such objects in their deployed configurations may be too large to fit within a launch vehicle.

SUMMARY OF THE INVENTION

A distributed structure may be launched into space within a storage container such as a launch shroud. Inside the container, elements of the distributed structure are arranged in a stowed configuration that differs from an operational configuration of the distributed structure. Systems and methods for assembly of such distributed structures in space using Electro-Magnetic Formation Flight (EMFF) are disclosed. Electro-Magnetic Formation Flight utilizes torque and force generated by interaction of magnetic fields generated by elements of the distributed structure and interaction of the magnetic fields generated by the elements and the magnetic field of the Earth. In particular, the elements of the distributed structure include coils through which current may be run to generate magnetic fields with various properties.

The disclosed systems and methods may maintain relatively close proximity between elements of a distributed structure because torque between two electric coils drops off by the cube of the distance between the coils, and force between the two coils drops off by the separation distance raised to the fourth power. That is force, F, is a function of power over distance to the fourth power. This means that the power required to generate a force between two objects that are moved to twice a particular distance apart is 16 times greater than when the two objects are located the particular distance apart. Because translational forces that can be generated between a current loop and the magnetic field of the Earth are small, the disclosed systems and methods may maintain a relatively close proximity between free-flying elements. In addition, the disclosed systems and methods account for torques between the elements and the Earth's magnetic field.

In some embodiments, the disclosed systems and methods provide an automated process for creating a top-level assembly plan to take each element of a distributed structure from its stowed location to a corresponding final point in a deployed configuration of the distributed structure. The assembly plan may maintain the element within a particular proximity of other elements of the distributed structure due to the properties of torque and force generated by magnetic fields discussed above.

In some cases, identical elements can be interchanged without impacting the process, and in other cases elements may be unique in their required placement. In some embodiments, the top-level assembly plan further identifies orientations of one or more elements in the final deployed configuration of the distributed structure. The orientations may be defined relative to other elements of the distributed structure.

In some implementations, the top-level assembly plan is generated by a high-level planning algorithm, herein referred to as the Architect, executed on a central computing device. The Architect creates the top-level assembly plan based on given stowed and deployed configurations. The top-level assembly plan can include a sequence of waypoints for each element of the distributed structure. The sequence of waypoints for an element is composed of several waypoints that the free-flying element targets during deployment. The waypoints include the initial and final locations of the element. In addition, the central computer device executing the Architect code may communicate with the elements of the distributed structure during the assembly process to monitor the assembly process and modify the top-level plan dynamically in the event of any faults during the assembly process.

Each element of the distributed structure further executes additional software to perform one or more operations. One software layer implemented by each element, referred to as the Planner, uses the waypoint information in the top-level assembly plan to create a more detailed path for the element to follow. The Planner can be executed in real-time onboard each element while the element is in route from its stowed to its deployed location. The Planner identifies and recruits other elements within the distributed structure to provide the necessary reaction forces (e.g., force and torque) for the assembly process. At each waypoint the Planner assesses whether the top-level assembly plan is being executed within nominal and acceptable limits. If the assembly process has fallen outside of acceptable limits, the Planner can request a new interim waypoint from the Architect to get back on track.

Each element further implements a software layer, referred to as the Controller, to control electric coils and any other actuators on both the element and any additional elements in the distributed structure that have been recruited to participate at the time of a maneuver. The Controller takes predicted relative separations, predicted orientations, and desired force and torque to be produced at the time of the maneuver and formulates specific commanded currents among all of the coils involved in the maneuver.

Each element further implements a software layer referred to as the Estimator. The Estimator takes in sensor data from the element and one or more other elements to estimate the current relative position, orientation, and both translational and rotational velocities for the element. In one embodiment, the sensor data includes Carrier Phase Differential GPS and an inertial measurement unit (IMU) that provides linear accelerations along, and angular rates around, all three principal axes of a body of the element. The Estimator provides the estimated current relative position, orientation, and translational and rotational velocities to the Controller.

Each element further implements a software layer referred to as the Predictor. The Predictor runs in real time on the element and continuously retrieves the most recent state estimates from the Estimator. The Predictor uses the state estimates to predict the position and orientation of the element relative to the distributed structure at a time associated with a next planned waypoint. The Planner uses the predicted state estimate to determine whether an intermediate waypoint must be established, or if the state at the next waypoint is within acceptable bounds to implement the required maneuver.

Thus, the disclosed systems and methods may be used to automatically assemble a structure from a stowed configuration into a deployed (e.g., assembled) configuration. The stowed configuration may be more efficiently packed as compared to the deployed configuration. Accordingly, structures that are relatively large or awkwardly shaped in a deployed configuration may be loaded into a delivery vehicle for deployment to space.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

Figure 1:
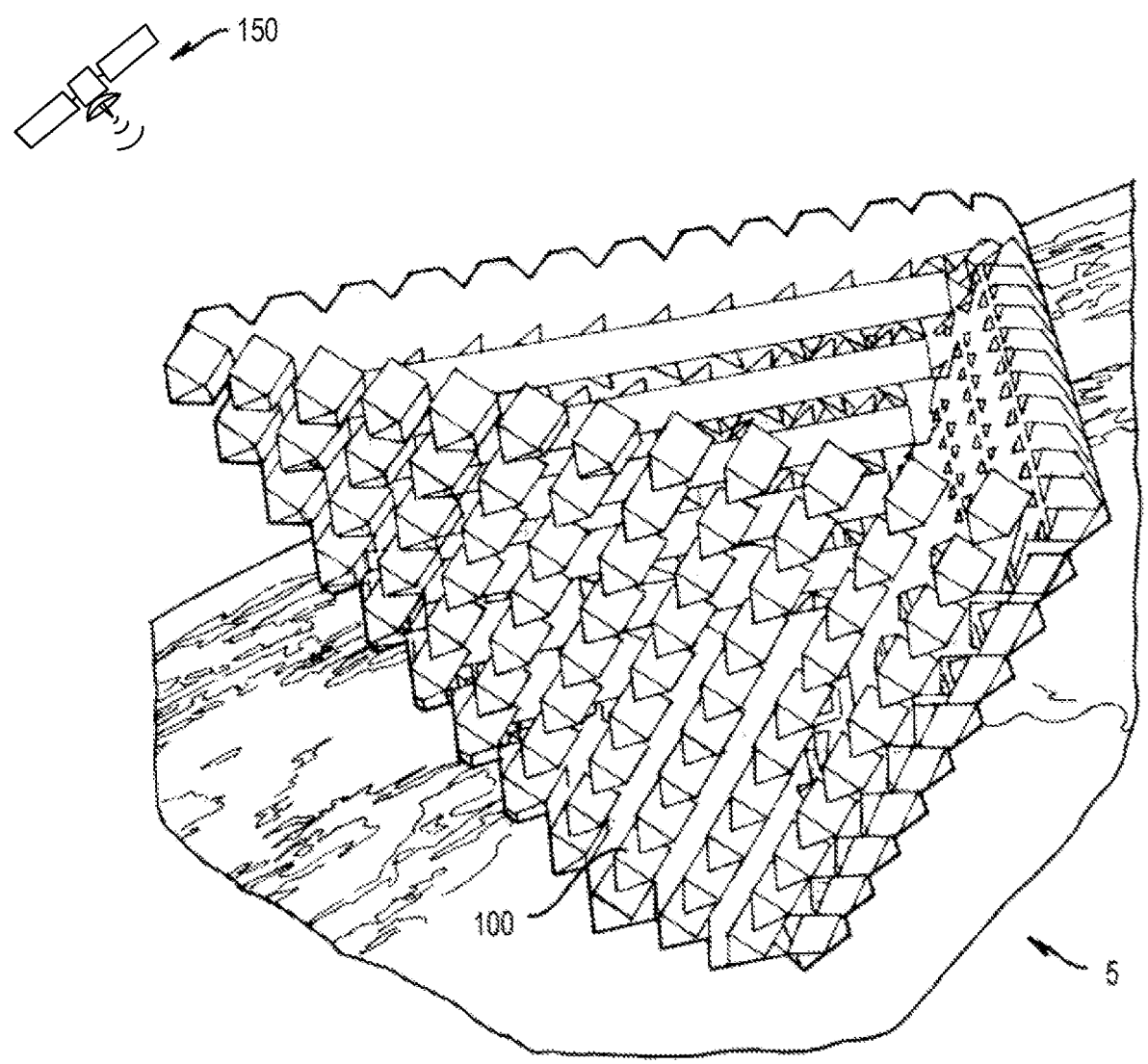
FIG. 1 is a perspective view of antenna structure in accordance with an embodiment of the invention.

In describing the illustrative, non-limiting preferred embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Figure 2:
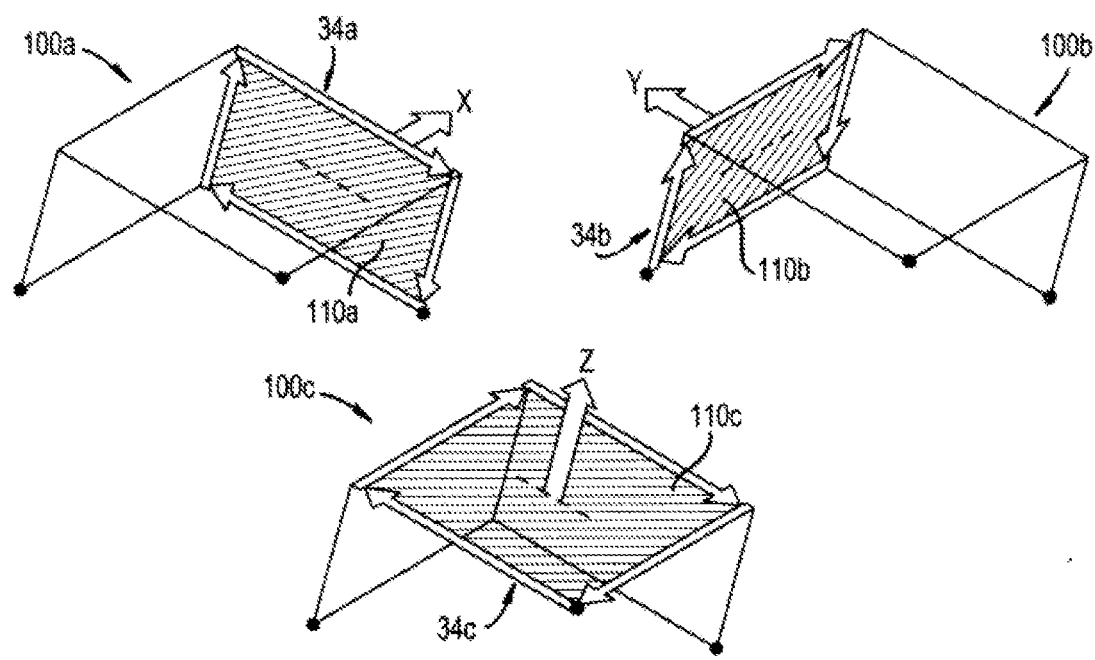
FIG. 2 is a perspective view of three identical structural elements, each with a different electromagnetic coil energized and showing the relationship between the direction of current flow and the resulting magnetic field.

Referring to FIGS. 1-4, a deployed configuration 5 of a distributed structure is shown. The distributed structure comprises a plurality of free-flying elements 100. As used herein free-flying generally refers to the structure being a discrete and independent device that is disconnected from other elements or things. In alternative embodiments, one or more of the elements 100 may be coupled to one or more others of the elements 100. FIG. 1 further illustrates a central satellite 150, such as the central satellite described in U.S. Pat. No. 9,973,266, the entire contents of which are hereby incorporated in their entirety. The central satellite 150 is optional and is not included in some embodiments. For illustrative purposes, three elements 100a, 100b, 100c are shown in FIG. 2, though any suitable number can be provided, such as hundreds or even thousands of elements. The elements 100 can be, for example, micron or small satellites. Assembly of the distributed structure into the deployed configuration 5 is an automated process. In the example of FIG. 1, the deployed configuration 5 is illustrated as a Tetrahedron formation, but other formations are possible. In some embodiments, the distributed structure corresponds to a phased array antenna. In such embodiments, each of the elements 100 includes components associated with a phased array antenna. The deployed configuration may be set by a user, as described below.

Figure 6:
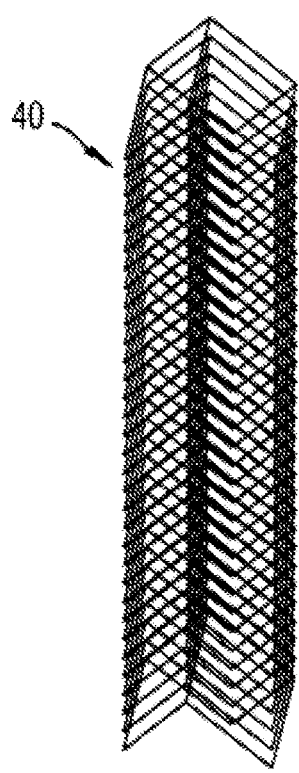
FIG. 6 is a diagram depicting the set of elements in the stowed configuration.

As illustrated by the non-limiting example embodiment of FIG. 6, the elements can be transported into space in a storage configuration 40 (e.g., within a storage container), such as a linear stacked arrangement, and assembled in space into the deployed configuration 5. In the storage configuration 40, the elements are located close to one another and may touch one another, so that they are very compact, densely located, and easily transported. As described further below, software executing at a central computer may generate a packaging and assembly order and may determine a top-level assembly plan to transform the elements from the storage configuration 40 (FIG. 6) into the deployed configuration 5 (FIG. 1). Further, software executing on each element 100 may target waypoints corresponding to the element, as identified by the top-level assembly plan, and initiate actions by one or more components of the element and/or other elements of the distributed structure in order to achieve the deployed configuration 5. Electromagnetic Formation Flight (EMFF) is utilized to generate forces and torques for assembly of the elements into the deployed configuration 5. Accordingly, the elements 100 may be assembled despite some embodiments not including thrusters or propellant.

Figure 3:
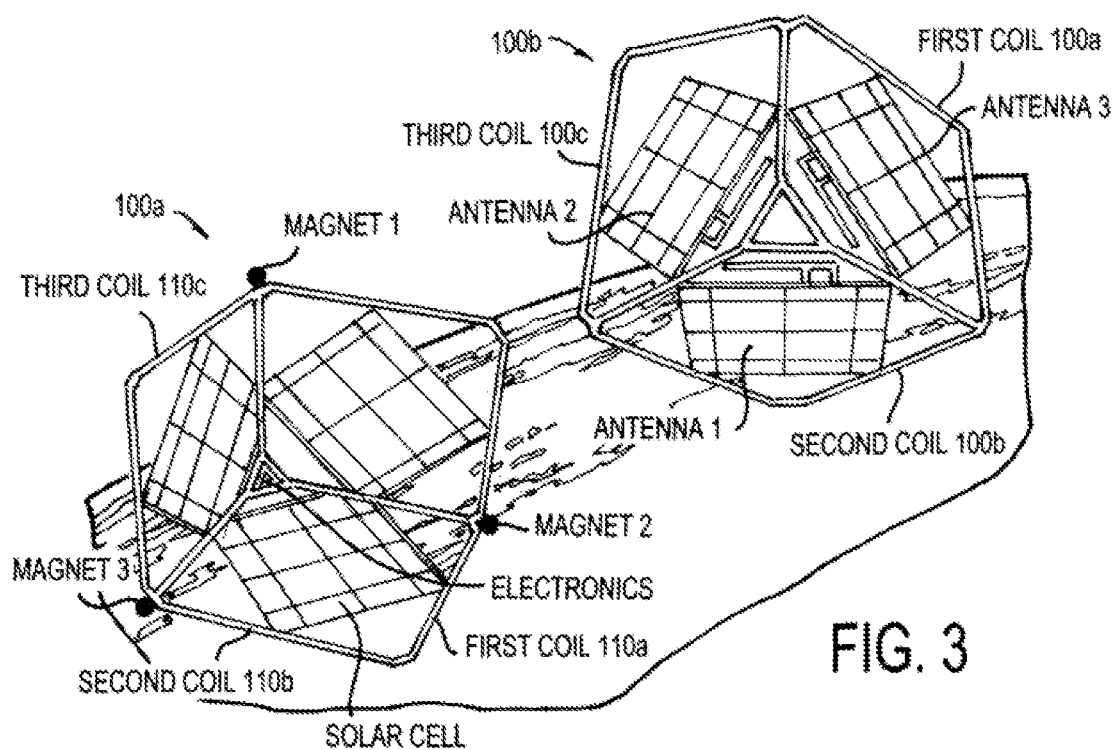
FIG. 3 is a perspective view of structural elements.
Figure 4:
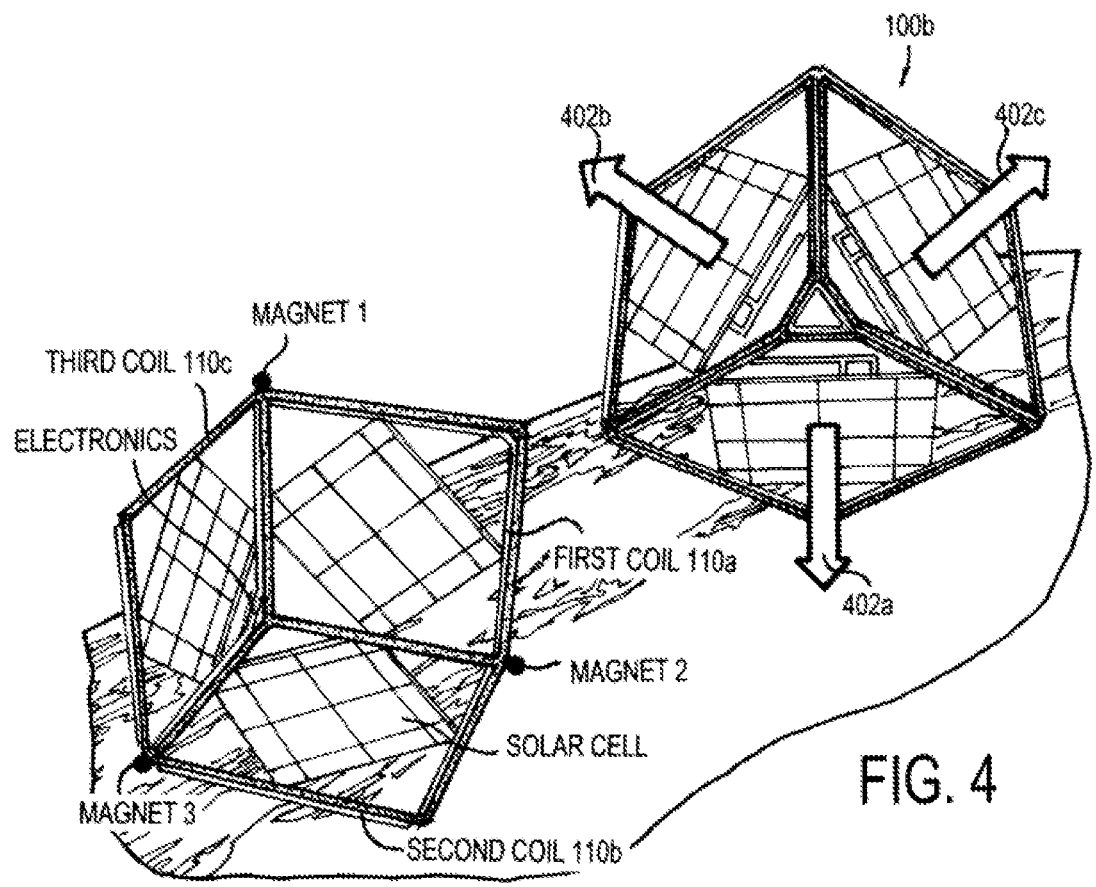
FIG. 4 is a perspective view of the elements of FIG. 3 showing electromagnetic forces induced by the coils.

As best shown in the illustrative, non-limiting example embodiments of FIGS. 3 and 4, each free-flying element 100 of the distributed structure is equipped with an impulse actuator (e.g., three planar coils 110 that can be energized (e.g., responsive to a command from a processor of the element 100) to carry a programmable level of current). The impulse actuator imparts movement to the element 100 so that the element 100 moves in a desired direction. Other examples of impulse actuators include ion thrusters, rocket engines, gas thrusters, plasma thrusters, etc. While the elements 100 are described herein as including and being moved by the planar coils 110, it should be noted that the disclosed embodiments may be implemented using other types of impulse actuators (e.g., thrusters).

In the illustrated example, the three coils 110 are mounted orthogonally, however other configurations in which the normal vectors to each of the coil planes span three dimensions of space are possible. In FIG. 2 the coils 110 are shown to comprise the edges of three adjacent faces of a virtual cube, however other relative locations are possible. Further, while the coils 110 are shown forming squares, other quadrilateral shapes or circular shapes are possible. Each of the elements 100 includes one or more power sources, one or more processor devices, one or more memory devices, one or more location sensors, and one or more communication interfaces attached to and/or enclosed by a frame or housing. In some embodiments, the elements 100 each further include additional components, such as fiber optical equipment capable of transmitting fiber optic signals between the elements 100.

The one or more power sources may include one or more photovoltaic devices, one or more thermoelectric generators, one or more batteries, or a combination thereof. The one or more processor devices may include one or more central processing units, one or more field programmable gate arrays, or a combination thereof. The one or more memory devices may include one or more random access memory devices, one or more solid state drives, one or more other memory devices, or a combination thereof. The one or more location sensors may include one or more global positioning system (GPS) receivers, one or more inertial measurement units (IMU), or a combination thereof. In a particular embodiment the one or more location sensors include three GPS receivers and an IMU with 3-axis rate gyros and accelerometers. The GPS receivers of a particular element 100 may be configured to generate carrier-phase differential GPS solutions for determining altitude of the particular element 100 and position of the particular element 100 relative to other elements 100.

The one or more communication interfaces may include one or more radio frequency transceivers, one or more antennas, one or more network interface controllers, or a combination thereof. For example, the one or more communication interfaces may include one or more Wi-Fi® interfaces, one or more Bluetooth® interfaces, one or more optical interfaces, one or more other types of wireless interfaces, or a combination thereof (Wi-Fi is a registered trademark of Wi-Fi Alliance Corporation California of Austin, Tex., and Bluetooth is a registered trademark of Bluetooth SIG, Inc. of Kirkland, Wash.). Thus, for example, the elements 100 can have optical wireless interfaces so that they can communicate with one another (and/or with the central satellite 150) to form an optical wireless network in a deployed configuration, whereby the optical wireless interfaces are aligned with each other when the element 100 is in the deployed configuration.

The frame or housing is formed such that the three coils 110 are mounted to the frame or housing orthogonally as described above. In some implementations the frame or housing of an element 100 corresponds to struts that form three orthogonal faces of a cube, and the coils and other components of the element 100 are attached to the struts.

Figure 5:
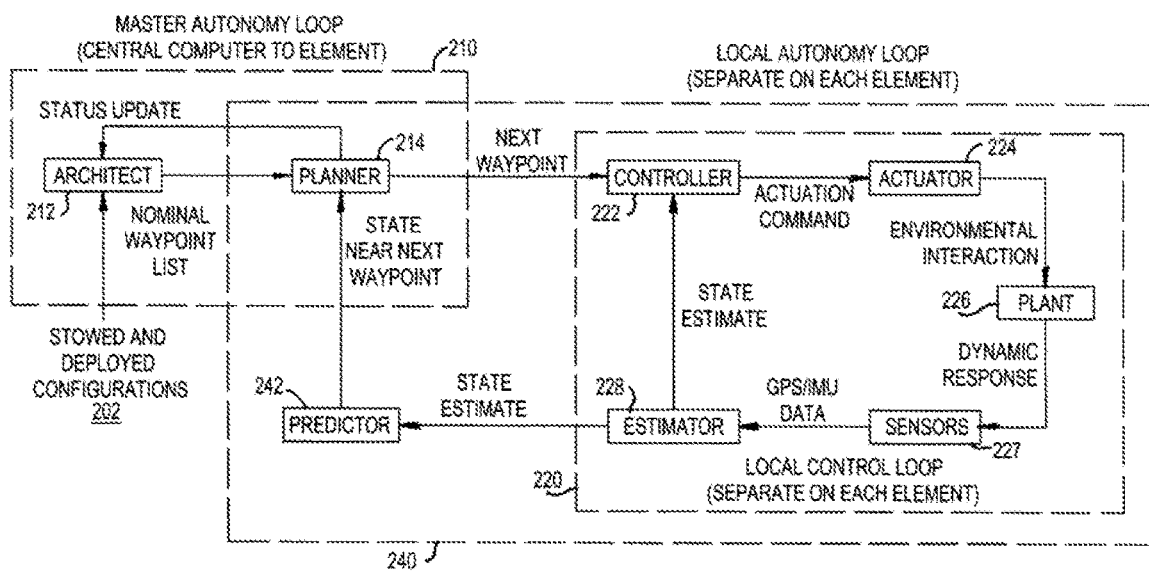
FIG. 5 is a block diagram of the autonomy and control architecture and identifies the three main control loops and the logic flow between the major elements.

The one or more memory devices store instructions executable by the one or more processor devices to perform various actions, as described herein (e.g., with respect to FIG. 5). For example, the instructions are executable to apply current to one or more of the coils 110 to generate a magnetic multipole field. Multipoles on different elements 100 interact to generate forces and torques that can be used to move the elements 100 around. Accordingly, the deployed configuration 5 may be formed by the elements 100 without using propellant.

Referring to FIGS. 2-4, a first element 100a is shown to illustrate a first coil 110a with a current 34a flowing in the direction shown by the arrows (clockwise in the embodiment of FIG. 2). The current 34a causes a magnetic field of the first element 110a to point in the direction of the heavy arrow along the x-axis. A leading order of the magnetic field will have a dipole nature, with the North pole pointing in the x-direction as shown. A second element 100b is shown to illustrate a second coil 110b with a current 34b running through the coil in the direction shown. The current 34b results in a magnetic field pointing along the y-axis. A third element 100c is shown to illustrate a third coil 110c having a current 34c running through the coil in the direction shown. The current 34c causes a magnetic field pointing along the z-axis. While the leading order of each magnetic field has a dipole nature, at close range each field will have higher order components as well. Accordingly, dipole approximations of the magnetic fields may be inadequate for predicting force and torque generated by interactions between the magnetic fields. Thus, the described systems and methods may consider higher order components of the magnetic fields.

While each element 100 in FIG. 2 is depicted as having one coil through which current flows, currents may simultaneously flow through more than one or fewer than one coil in a particular element 100 based on signals from the one or more processor devices of the element 100. For example, FIG. 3 depicts each of the first element 100a and the second element 100b including the coils 110a-110c. Further, FIG. 4 depicts electromagnetic forces 402a-402c induced by the three coils of the third element 400b element 100b. Because the three coils 110 of each element 100 span 3D space, the superposition of the magnetic fields 402 generated by the three coils 110 of the element 100 is independently steerable from the orientation of the free-flying element 100. Steerable fields in 3D allow for a greater variety of field solutions to generate a desired force and torque regardless of element orientation. Accordingly, rotation of each element 100 may be at least partially controlled without the use of a reaction wheel or other momentum storage mechanism.

FIG. 5 is a control loop diagram of a control architecture or system 200 for planning and deploying a distributed structure in space. Elements of the control system or architecture correspond to software and/or hardware of the elements 100, a central computer device, or a combination thereof. The control architecture or system 200 includes a master autonomy loop 210 (from the central computer to each element 100), a local control loop 220 (separate on each element 100), and a local autonomy loop 240 (separate on each element 100). The master autonomy loop 210 includes interactions between an Architect module 212 and a Planner module 214. The local control loop 220 includes interactions between a Controller module 222, Actuator 224, Plant 226, Sensors 227, and Estimator module 228. The local autonomy loop 240 includes interactions between the local control loop 220 elements, the Planner 214, and a Predictor module 242. The Planner 214, Controller 222, actuator 224, Plant 226, Sensors 227, Estimator 228 and Predictor 242 are all located at each respective element 100, and the Planner 214, Controller 222, Estimator 228, and Predictor 242 are operations performed by the processor of the element such as by software. The loops 210-240 may operate at different speeds/frequencies. For example, the local control loop 220 may operate faster and/or more frequently than local autonomy loop 240. Further, the local autonomy loop 240 may operate faster and/or more frequently than the master autonomy loop 210.

The master autonomy loop 210 includes interactions between an Architect module 212 and a Planner module 214. The Architect 212 corresponds to operations executed on one or more processor devices (e.g., by software) of a central computing device and the Planner 214 corresponds to operations executed on the one or more processor devices (e.g., software) of one of the elements 100. The central computing device may correspond to a specialized one of the elements 100, the central satellite 150, a ground control device, or to some other computing device. In some implementations, the central computing device executing Architect 212 corresponds to more than one device. For example, a ground control device may execute the Architect 212 and provide functions of the Architect 212 described herein as occurring prior to launch of the elements 100 while the central satellite 150 may execute the Architect 212 and provide functions of the Architect 212 described herein as occurring after launch of the elements 100. The Architect 212 communicates with the Planner 214 via one or more communication interfaces of the central computing device and the one or more communication interfaces of the element 100. In some examples, communications sent between the central computing device and element 100 pass through one or more intermediate devices (e.g., the Internet, one or more satellites, etc.). The Architect 212 may communicate with a Planner 214 on each of the elements 100 in the distributed structure.

At an entry point 202 in the architecture or system 200, representations of the initial stowed and desired deployed system configurations of the distributed structure are input into the Architect 212. For example, an operator of the central computing device may input the stored and deployed configurations into the Architect 212 using a user interface device at the central computing device or by communicating the input to the central computing device via its communication interface. As another example, the Architect 212 may receive the stored and deployed configurations from another computing device. The Architect 212 ingests the two configurations through a pre-processor that maps each element in the stored configuration to its corresponding element in the deployed configuration. The Architect 212 then constructs a top-level assembly plan (e.g., a deployment map) based on the accessibility of each element and its proximity in the deployed configuration. The top-level assembly plan may be constructed by the Architect 212 prior to launch of the elements 100 in an offline mode without interaction with the elements 100.

Figure 7:
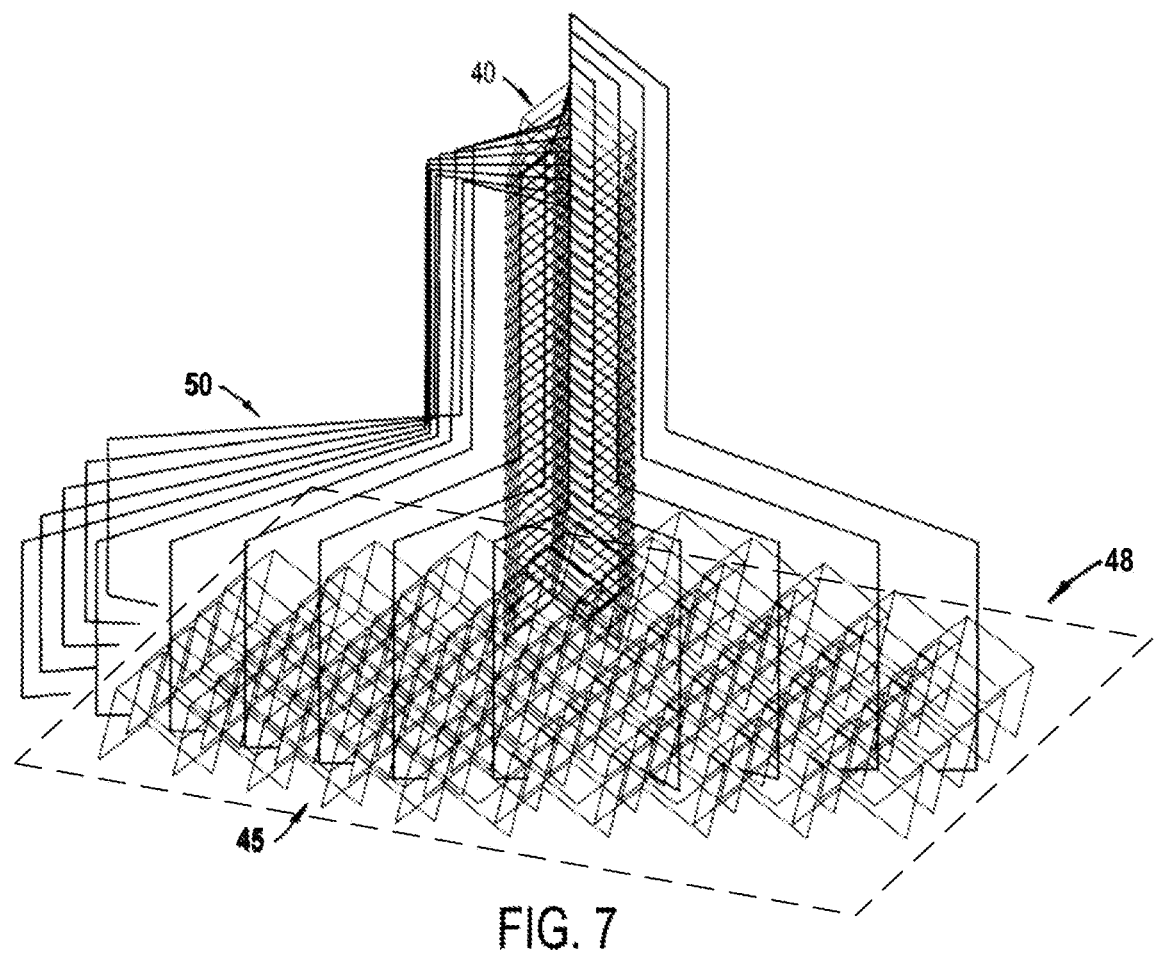
FIG. 7 is a perspective view of a partially assembled structure, identifying the set of elements that are still in the stowed configuration, those that are in the assembled configuration and the paths and waypoints that connect the stowed elements to their eventual location in the assembly.

As shown in FIG. 7, the top-level assembly plan (e.g., deployment map) includes a sequence of waypoints 50 for each of the elements 100, connecting them between their initial locations in the stored configuration and final locations in the deployed configuration. Each waypoint corresponds to a location, a time, or a combination thereof. FIG. 7 shows a partially assembled distributed structure including dozens of the generic elements 100 introduced in FIG. 2. Each of the remaining stowed elements is shown in the initial stack 40 (e.g., a stored configuration) and is connected via a sequence of waypoints 50 to the anticipated location of the same element in a final assembly 45 (e.g., a deployed configuration). The final assembly 45 may correspond to the deployed configuration 5 described above. In the final assembly 45, each of the elements 100 may be physically separated. Alternatively, one or more of the elements 100 may be in contact with one or more others of the elements 100. For example, in some implementations, each element 100 is held to another element 100 in the final assembly 45 by attractive forces between magnets included in the elements 100. Further, in some implementations, the elements 100 establish a fiber optic links between each other in the final assembly 45. For example, fiber optical equipment of the elements 100 may be aligned in the final assembly 45.

In the illustrated example of FIG. 7, the Architect 212 mapped the elements 100 from an initial position or location in the initial stack 40 to a final or desired position or location in the final assembly 45. This is done by taking each topmost element 100 sequentially from the top of the initial stack 40 assigning the element 100 to a next available final location in a horizontal plane 48 of the final assembly 45, starting at an arbitrary location in the horizontal plane 48 and working outward and then clockwise until a complete ring is formed. The paths of each element 100 in the initial stack 40 are then generated by applying the same generic sequence to each element 100: (a) move up by a fixed distance off the top of the initial stack 40, (b) move horizontally in the direction of the final location of the element 100 until at a fixed distance away from the initial stack 40, (c) move down until within a fixed distance of the horizontal plane 48, (d) move horizontally in the direction of the final location until at fixed distance beyond the final location (i.e., just beyond the outermost element in the horizontal plane 48 (which can be the stack 40 if it is the first element in that horizontal plane 48)), (e) move down until at a vertical position of the element 100 is the same as that of the horizontal plane 48, and (f) move horizontally toward the final location of the element 100.

This generic sequence can then be automatically applied just as easily to thousands of elements as it can be to dozens, and simply encoded by the Architect 212 as a sequence of seven waypoints, including the starting and ending locations. The Architect 212 encodes the waypoint positions in the sequence of waypoints for an element relative to the starting and/or ending locations of the element, as well as to other fixed elements that are either in their stowed or deployed locations. Accordingly, an actual path traveled by an element adjusts based on the actual structural geometry of other elements at each instant, rather than including a predetermined sequence of absolute locations in space. It should be noted that the Architect 212 may use a different algorithm to construct the top-level assembly plan than is illustrated in FIG. 7. In some implementations, each element 100 in the initial stack 40 is not interchangeable with every other element 100. Accordingly, in some implementations, the Architect assigns a particular element 100 to a particular final location in the final assembly 45. In some implementations, the Architect 212 may encode more than seven or fewer than seven waypoints in one or more sequences of waypoints. Further, the top-level assembly plan may include a different number of waypoints per element 100. For example, a first element may be assigned 3 waypoints while a second element is assigned 8 waypoints.

Referring again back to FIG. 5, the Architect 212 communicates the sequence of waypoints identified by the top-level assembly plan for an element 100 to the Planner 214 in that element 100. During movement of the element 100, an Estimator module 228 at the element 100 determines the position of the element and provides that position to the Predictor module 242 and to the Controller module 222. The Controller 222 uses the current position from the Estimator 228 to control movement of the element 100. The Predictor module 242 uses the current position from the Estimator 228 to determine a predicted path for the element 100, which is then provided to the Planner 214. The Planner 214 then determines if the predicted path is nominal (acceptable) or not. If the predicted path execution is nominal (e.g., within a tolerance threshold), the Planner 214 will simply report back to the Architect 212 after each waypoint is reached by the element 100, that execution of the plan is going according to plan.

However, if a predicted path of the element 100 will miss the next waypoint by too great of a margin, the Planner 214 will make a request to the Architect 212 for an intermediate waypoint. The request identifies a timing and location of a proposed intermediate waypoint selected by the Planner 214. The Architect 212 determines whether any recruited elements 100 for the maneuver to the proposed intermediate waypoint are not already scheduled for a separate maneuver at a conflicting time. Based on determining that the proposed intermediate waypoint does not create such a conflict, the Architect 212 sends an approval message to the Planner 214 and the Planner 214 sets the intermediate waypoint as a next waypoint. Once the Planner 214 reports to the Architect 212, that the element 100 has reached its destination waypoint in the deployed configuration of the distributed structure, the Architect 212 sends a waypoint list to a next element 100 until each and every element 100 has been moved to a corresponding destination waypoint in the deployed configuration.

Thus, in the master autonomy loop 210 depicted in FIG. 5, the Architect 212 develops an initial top-level assembly plan offline (e.g., on Earth) in advance of deployment. The Architect 212 numbers each element 100 for deployment. In an illustrative example, assigns each of the elements 100 a sequence number. For example, the elements 100 may be sequentially numbered 1, 2, 3, 4 etc. During assembly of the distributed structure, the Architect 212 initiates movement of each element 100 sequentially (e.g., of the element corresponding to the sequence number 1, then to the element corresponding to the sequence number 2, etc.) by sending a waypoint list to the Planner 214 of the element 100. Alternatively, the Architect 212 may send the corresponding waypoint list to each of the Planners 214 of the elements 100 pre-launch and may sequentially initiate movement of each of the elements 100 by sequentially sending an activation signal to the elements 100 post-launch. In some implementations, each of the elements 100 is associated with an identifier. The unique identifier may be a universally unique identifier used to address the corresponding element 10 during communication. The Architect 100 may store a data structure mapping identifiers to corresponding sequence numbers and waypoint lists. An illustrative example of an entry in such a data structure is "Element 31341, Sequence number 4, waypoint list 1," where Element 31341 is an identifier of a particular one of the elements 100, sequence number 4 indicates that the particular element 100 is to be deployed $4^{th}$, and waypoint list 1 identifies a waypoint list to be sent to the particular element 100.

The Architect 212 monitors a cadence of assembly and adjusts based on feedback from the Planner 214. The Planner 214 tracks each movement task to completion or fault and implements automated contingency plans for task faults, such as halting movement of the element 100 and requesting ground assistance from the Architect 212 if a fault is unresolved.

The Planner 214 executes the code on each element 100, and provides nominal path prototypes from the Architect 212. Waypoints 50 are established between start and end states. A nominal path can be updated with requests from the Predictor 242 to establish intermediate waypoints and stay within tolerances. The Planner 214 also signals the Architect 212 that the plan has been executed or if a fault occurs.

The Planner 214 takes the next waypoint in the waypoint list and passes it to a Controller module 222. The Controller 222 corresponds to operations executed by the one or more processors (e.g., by software) of the element 100. The Controller 222 initiates movement of the element 100 as part of the local control loop 220. The Controller 222 is configured to issue one or more commands to one or more Actuators 224 of the element 100 to activate one or more of the coils 110 of a Plant 226 of the element 100. The Plant 226 corresponds to physical systems of the element 100 controlled by the Actuators 224. For example, the Plant 226 includes the coils 110. The Controller 222 causes current to flow through one or more of the coils 110 to generate a magnetic field configured to move the element 100 toward the next waypoint identified by the Planner 214. In addition, the Controller 222 may signal one or more other elements 100 to request that the other elements 100 cause current to flow through one or more respective coils 110 or order to generate one or magnetic fields. The interactions between the magnetic field of the element 100 and the one or more other elements 100 applies a force or a torque to the element 100 and moves the element 100 toward the next waypoint.

In some implementations, the Controller 222 may issue no actuation commands between waypoints. The Estimator module 228 continuously monitors the Sensors 227 of the element 100 to form an estimate of the current state of the element 100. The Sensors 227 may correspond to a carrier phase differential GPS (CPD-GPS), an inertial measurement unit (IMU), or a combination thereof. In some examples, the IMU includes three accelerometers and three rate gyros. The CPD-GPS attitude estimates are derived from three onboard GPS receivers, while the estimates of the relative position of the moving element 100 with respect to the distributed structure is determined based on GPS receivers onboard the moving element 100 in conjunction with GPS receivers that are located on other elements that are already fixed in the assembly. The state may include an estimate of current relative position, orientation, translational velocity, rotational velocity, acceleration, or a combination thereof. For example, the Estimator 228 may combine velocity and positional readings to generate the state. Alternatively, the Estimator 228 may integrate velocity readings to generate an estimate of position to include in the state estimate. The Estimator 228 passes the state estimates to the Controller 222, which then compares the estimates to the location of the next waypoint and the local control loop 220 continues.

The Estimator 228 also communicates the current state estimate to the Predictor 242. The Predictor 242 integrates the current state forward in time toward the next waypoint, and passes the location and time of the closest approach to this upcoming waypoint to the Planner 214. The Planner 214 then uses this information to determine if the predicted closest approach to the waypoint falls within an acceptable margin of error. If the estimate exceeds a threshold distance from the waypoint, the Planner 214 requests an intermediate waypoint, as described above, and adds the intermediate waypoint to the waypoint list.

In some implementations, the Controller 222 initiates generation of magnetic fields, by the element 100 and one or more other elements 100, configured to reduce an angular rate of the element 100 at each waypoint. This can be achieved as a result of having more independent actuator degrees of freedom available 6 than are necessary 3 to specify a translational impulse at the waypoint.

Thus, the disclosed systems and methods may be used to automatically assemble a structure from a stowed configuration (stack 40, FIG. 6) into a deployed (e.g., assembled) configuration (FIG. 1). The stowed configuration may be more efficiently packed as compared to the deployed configuration. Accordingly, structures that are relatively large or awkwardly shaped in a deployed configuration may be loaded into a delivery vehicle for deployment to space.

The Actuator 224 is configured to pulse current through one or more of the coils 110, which provides two primary advantages. First, while the forces and torques that result from an applied current are highly non-linear in separation distance and orientation, if these can be assumed constant over the pulse period, then this non-linearity is removed, at least with respect to the control architecture or system 200. While the rotational dynamics are still non-linear, the rotation rates are slow and therefore the non-linear terms do not have a major impact on the state evolution. For the example structural elements that are being considered here, the primary moments of inertia would all be equal, and the rotational dynamics are, in fact, linear.

Because the separation distances between the moving and fixed elements 100 are comparable to their sizes, the magnetic fields that are generated by the elements 100 cannot be assumed to be pure dipole fields. Representation of the field as a multipole expansion is also too cumbersome for analytic evaluation of the resulting forces and torques. Instead, both the Controller 222 and the Predictor 242 utilize the same numerical integration of the Biot-Savart Law to determine the forces and torques that would result from a given applied current to each of the coils 110 of at least two elements 100 at a fixed relative geometry. That is, the Biot-Savart Law, is modified to evaluate the force between two interacting elements 100 (3 coils each).

The pair-wise double integration between each of the three coils 110 on at least two participating elements 100 is somewhat computationally expensive (e.g., may consume a relatively high number of computation cycles and/or power). Herein lies the second advantage of the waypoint control architecture, since the inverse problem of how much current to apply to each coil in order to produce the desired impulse on the element may be to be evaluated a few times in between waypoints rather than calculated continuously between an origin and a destination.

To solve the inverse problem (i.e., how much current to apply to each coil in order to produce a desired impulse on an element), it is noted that in the evaluation of the Biot-Savart Law the product of the two coil currents factors out. In other words, the geometric impact on the force and torque between two coils is decoupled from the magnitude of the product of the currents. Knowing then the relative position and orientations, the Predictor 242 can evaluate coupling matrices between the coil pairs without assuming any applied current levels. These coupling matrices can be passed to the Controller 222 (via the Planner 214), which can then solve the less computationally intensive problem of what combination of currents will generate the desired impulsive force while also minimizing angular rates. A perturbative update can be used to quickly refine an already calculated solution under small changes in the predicted state.

The coupling matrix provides a much more exact representation of the forces and torques between two coils than what can be achieved by approximating interactions between coils with dipole approximations. At close range, where the separation distance between the coils becomes comparable to their size, the true magnitude of an interaction can be off by several times what a calculation based on dipole approximations would indicate. Accordingly, corrective actions initiated by a controller based on dipole approximations of coils may amplify rather than reduce the errors, causing a system to become unstable. Therefore, the Controller 222 may more accurately reduce errors in a configuration by considering coupling matrices calculated according to the Bio-Savart law, as described above, as compared to a controller that considers dipole approximations of coils.

Referring now to FIGS. 8-14, diagrams illustrating deployment of a particular element 710 are shown. FIGS. 8-14 show the particular element 710 moving from a first waypoint 720 (e.g., an initial location/a stowed location) in the initial stack 40 of FIG. 6 along one of the predetermined paths 50 to a seventh waypoint 732 (e.g., a deployed location) within the final assembly 45.

Figure 8:
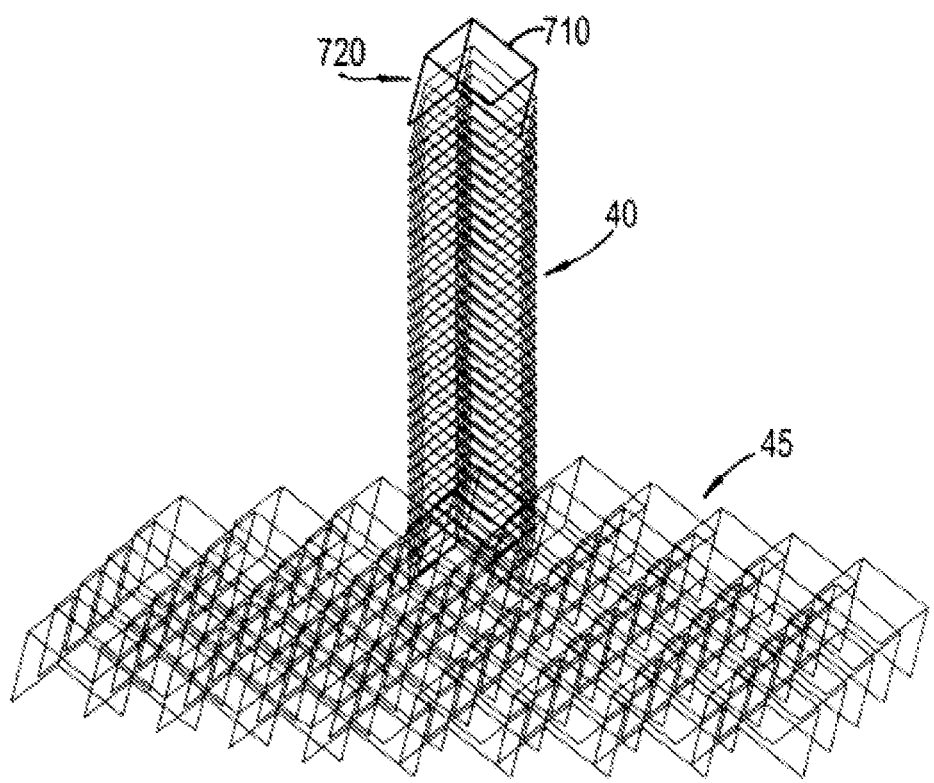
FIG. 8 is a diagram illustrating a first stage of a process of deploying an element.
Figure 9:
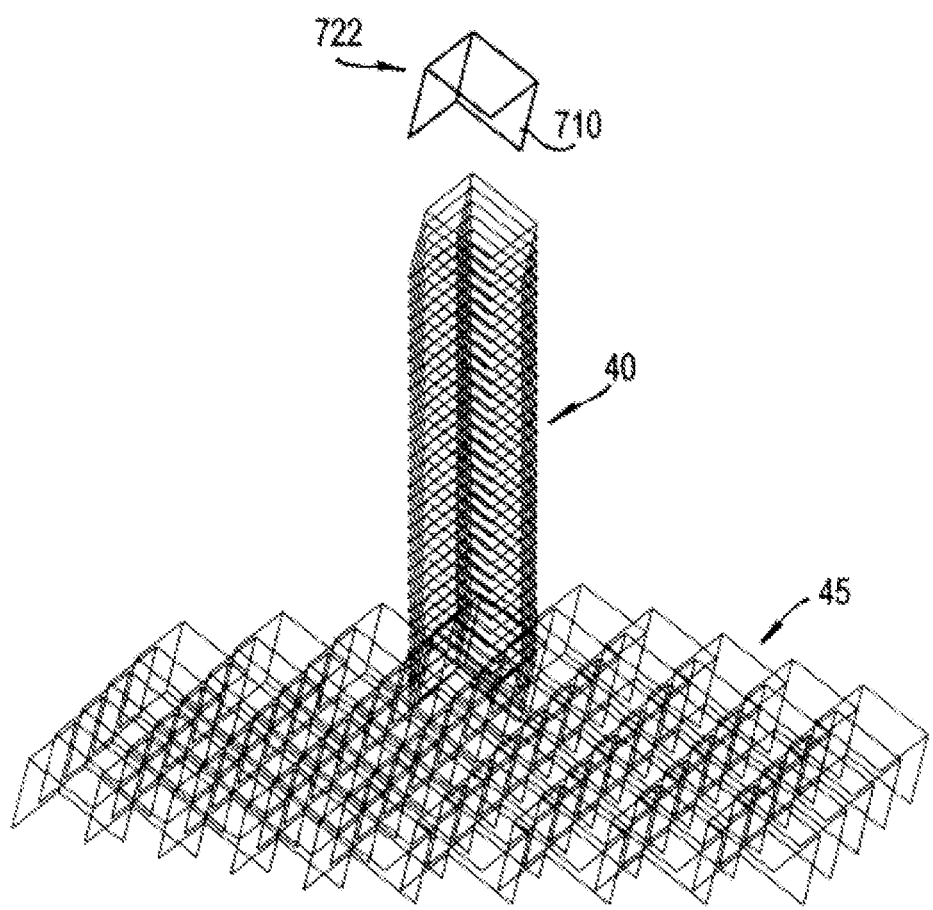
FIG. 9 is a diagram illustrating a second stage of the process of deploying the element.
Figure 10:
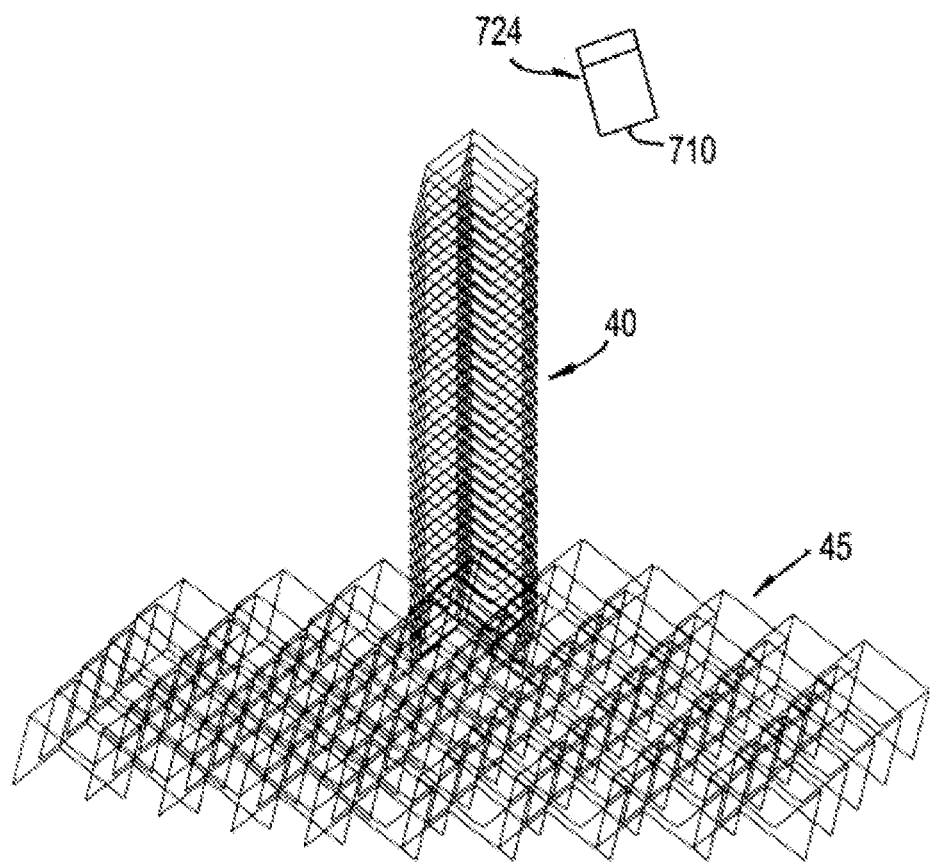
FIG. 10 is a diagram illustrating a third stage of the process of deploying the element.
Figure 11:
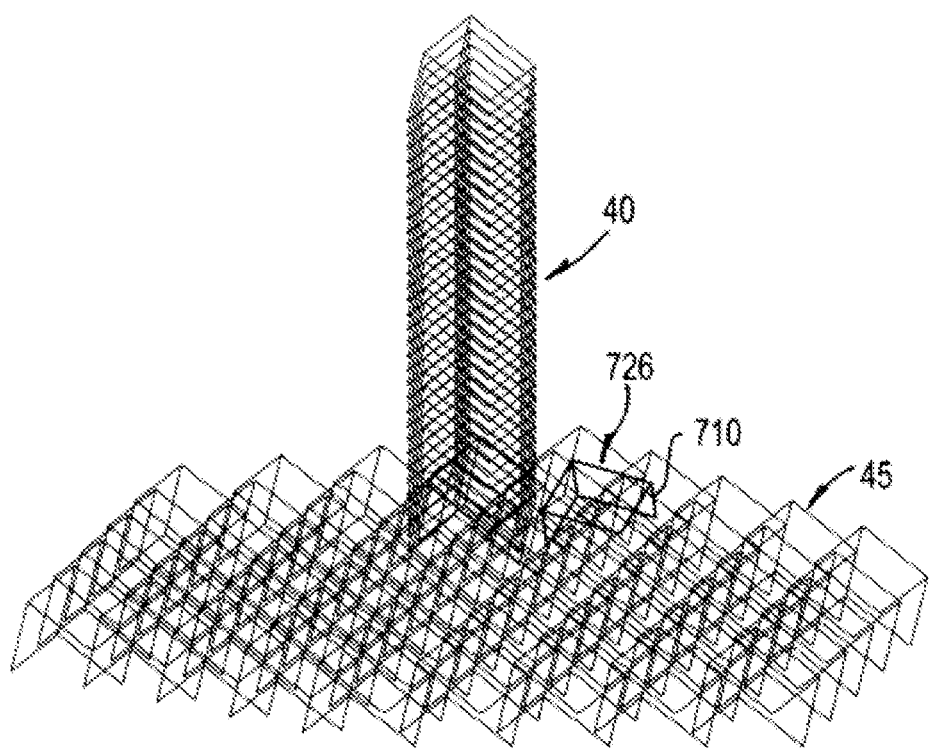
FIG. 11 is a diagram illustrating a fourth stage of the process of deploying the element.
Figure 12:
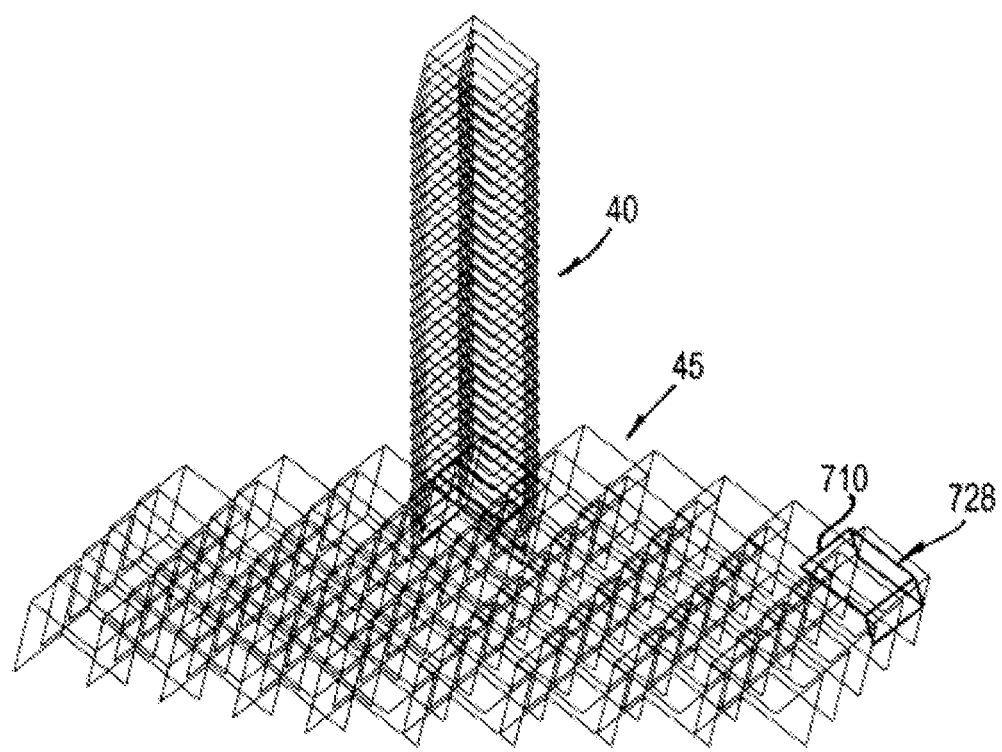
FIG. 12 is a diagram illustrating a fifth stage of the process of deploying the element.
Figure 13:
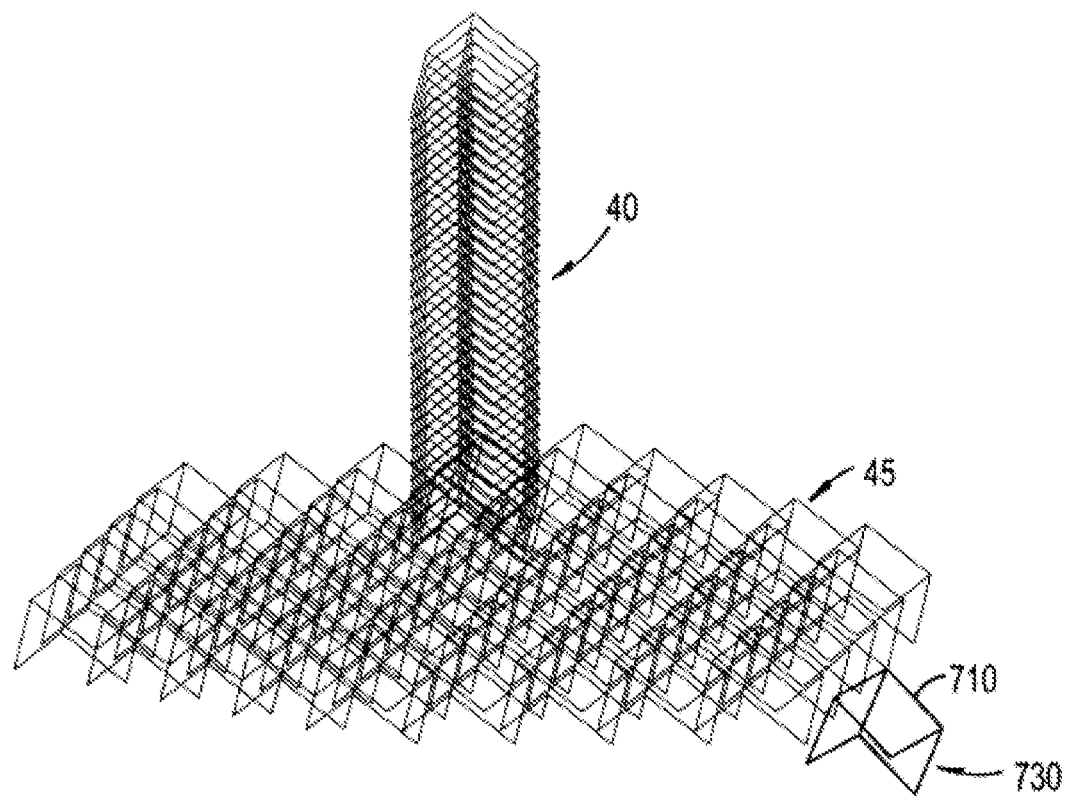
FIG. 13 is a diagram illustrating a sixth stage of the process of deploying the element.
Figure 14:
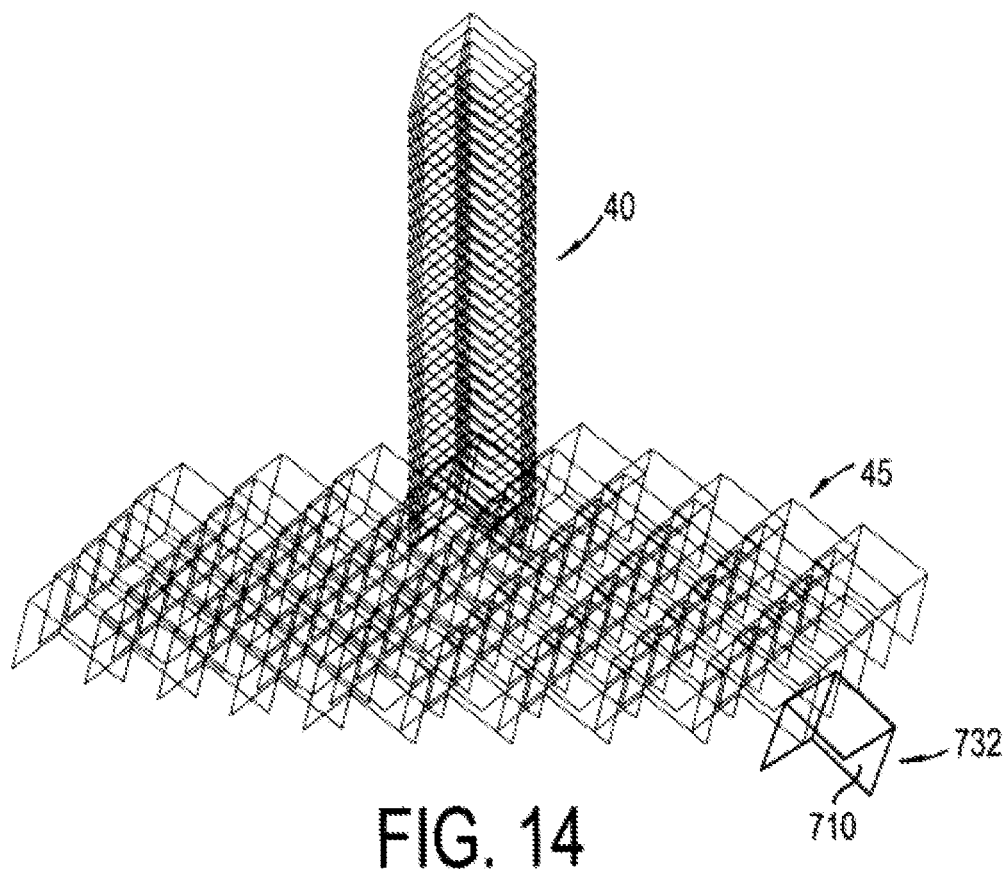
FIG. 14 is a diagram illustrating the element in a deployed location.

FIG. 8 depicts the particular element 710 at the first waypoint 720. As explained above, the particular element 710 (and each other element shown) includes its own instance of the Planner 214, the Controller 222, the Actuator 224, the Plant 226, the Sensors 227, the Estimator 228, and the Predictor 242. The Planner 214 of the particular element 710 receives a sequence of waypoints from the Architect 212 of a central computing device. In response to the sequence of waypoints the Planner 214 initiates operations to move the particular element 214 from the first waypoint 720 through the sequence of waypoints to the seventh waypoint 732 in the final assembly 45. Each of the waypoints in the sequence of waypoints may correspond to a location, an orientation, or a combination thereof. The waypoints may be correspond to locations and/or orientations relative to others of the elements 100.

In particular, the Planner 214 instructs the Controller 222 to move the particular element 710 from the first waypoint 720 to a second waypoint 722, to a third waypoint 724, to a fourth waypoint 726, to a fifth waypoint 728, to a sixth waypoint 730, and to the seventh waypoint 732 as depicted in FIGS. 8-14. To initiate movement of the particular element 710 to the second waypoint 722, and from each waypoint to the next waypoint, the Controller 222 determines how much current to apply to each of the coils 110 in the particular element 710 and in one or more other elements of the initial stack 40 and/or the final assembly 45 in order to move the particular element 710 to the second waypoint 722 or to the next waypoint.

To illustrate, as described above, for each coil $c_i$ 110 of the particular element 710, the Controller 222 may calculate one or more coupling matrices for each coil $c_i$ 110 of the particular element 710 based on the Biot-Savart Law. Each coupling matrix for the coil $c_i$ 110 describes calculated forces and torques between the coil $c_i$ 110 and a corresponding coil 110 in another element for a plurality of current levels. For example, a first coupling matrix may describe calculated forces and torques between the coil $c_i$ 110 and a first coil 110 in a first element of the initial stack 40 and a second coupling matrix may describe calculated forces and torques between the coil $c_i$ 110 and a second coil 110 in a second element of the initial stack 40. Based on the calculated coupling matrices for the particular element 710, the Controller 222 determines how much (if any) current to apply to each of the coils $c_i$ 110 and to one or more coils of one or more other elements to move the particular element 710 to the second waypoint 722.

Once the Controller 222 determines which coils of the particular element 710 to activate and how much current to apply to the activated coils, the Controller 222 signals the Actuator 224 accordingly. In addition, once the Controller 222 determines which coils of one or more other elements to activate and how much current to apply to the activated coils, the Controller 222 initiates transmission of one or more signals to the one or more other elements to request activation of those one or more other coils. For example, the Controller 222 of the particular element 710 may initiate transmission, via the one or more communication interfaces of the particular element 710, of a request to the Controller 222 of another one of the elements 100 to activate one or more of the element's coils 110. The particular element 710 may directly communicate with the other element or indirectly communicate with the other elements via the central satellite 150. The elements 100 can communicate with each other and/or the central satellite 150 wirelessly (e.g., via Wi-Fi, Bluetooth, etc.). The Controller 222 of the other element 100 signals the Actuator 224 of the other element 100 accordingly. The Controller 222 of the particular element 710 may request that one or more of the elements 100 activate one or more corresponding coils in this fashion.

The Actuator 224 activates the corresponding coils of the Plant 226 accordingly. The Sensors 227 transmit GPS data, inertial data, other positional data, or a combination thereof to the Estimator 228. Based on data from the Sensors 227, the Estimator 228 estimates a state of the particular element 710. The state includes a current relative position of the particular element 710, orientation of the particular element 710, translational velocity of the particular element 710, rotational velocity of the particular element 710, acceleration of the particular element 710, or a combination thereof. The Estimator 228 sends the state estimate to the Controller 222 and to the Predictor 242.

The Predictor 242 analyzes the state to predict a closest approach of the particular element 710 to the next waypoint (e.g., the second waypoint 722). In response to the prediction indicating that the particular element 710 will not approach the next waypoint within a margin of error, the Planner 214 sends a request to the Architect 212 to add an intermediate waypoint to the sequence of waypoints, as described above. If the Architect 212 approves the request, the Planner 214 adds the intermediate waypoint to the sequence of waypoints as the next waypoint.

The Controller 222 compares the state to the next waypoint (e.g., the second waypoint 722 or an intermediate waypoint if the Planner 214 added an intermediate waypoint to the sequence of waypoints) in the sequence of waypoints.

In response to determining that the particular element 710 is within a threshold target distance of the next waypoint (e.g., the second waypoint 722), the Controller 222 removes the next waypoint from the sequence of waypoints and initiates movement of the particular element 710 to a new next waypoint (e.g., the second waypoint 722 or the third waypoint 724) as described above. This process continues until the particular element 710 reaches the seventh waypoint 732.

In the example illustrated in FIGS. 8-14, the particular element 710 starts at a first waypoint 720 (e.g., an initial location) at the top of the initial stack 40 and then moves vertically to the second waypoint 722 where it is at a distance from the initial stack 40 to be able to move to the third waypoint 724. The particular element 710 then moves horizontally in the general direction of seventh waypoint 732 (e.g., its deployed location) to the third waypoint 724 to be aligned with the horizontal plane 48 in which it will be deployed. That movement creates a sufficient distance between the element 100 and the stack 40 so that the element 100 can move downward along the stack to the fourth waypoint 726. Thus, the particular element 710 then moves down along the initial stack 40 to the fourth waypoint 726, where it is aligned with the horizontal plane 48 in which it will be positioned.

The element 710 then moves horizontally outward and away from the initial stack 40 to the fifth waypoint 728 where it reaches the outermost element in that horizontal plane 48. If the element 710 is the first element in that horizontal plane 48, the element 710 will not need to move horizontally outward, but will be at the bottom of the stack 40. The particular element 710 then moves down into the horizontal plane 48 occupied by the rest of the final assembly 45 to the sixth waypoint 730, where it is aligned with the outermost element in the horizontal plane 48. Finally, the particular element 710 moves inward in the horizontal plane 48 back toward the initial stack 40 into the seventh waypoint 732 (e.g., the deployed location).

At the seventh waypoint 732 the particular element 710 may be coupled with one or more of the other of the elements 100 in the final assembly 45. The elements 100 can be physically coupled together, though in one embodiment the elements 100 do not touch one another. For example, the elements 100 can have a coupling device such as one or more magnets, and the particular element 710 may be held in place by attractive forces between magnets of the particular element 710 and magnets of the adjacent elements 100 in the deployed configuration (but not in the stowed or storage configuration). Further, at the seventh waypoint 732, fiber optic equipment (e.g., the optical interface) of the particular element 710 may be aligned with fiber optic equipment of adjacent elements 100 in the final assembly 45. Accordingly, a fiber optic communication network may be established between the elements 100 in the final assembly 45.

As described above, when moving from each waypoint to the next waypoint, the particular element 710 may recruit nearby elements of the initial stack 40 and/or the final assembly 45 to activate one or more of their coils to generate a magnetic field to interact with a magnetic field generated by one or more coils of the particular element 710 in order to apply force to the particular element 710.

Once the Planner 214 detects that the particular element 710 has moved sufficiently far from the first waypoint 720, the Planner 214 signals the Architect 212, and the Architect 212 may then initiate movement of a next element from a corresponding stowed location to a corresponding deployed location as described above with respect to the particular element 710. Thus, elements of the initial stack 40 may be moved sequentially and can be moved one at a time or more than one element can simultaneously move to respective deployed locations.

It is further noted that the description uses several geometric, directional, positioning or relational terms, such as linear, horizontal, and orthogonal. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, coils may not be exactly orthogonal to one another but still be considered to be substantially orthogonal because of, for example, tolerances allowed in manufacturing, etc. And, other suitable geometries and relationships can be provided without departing from the spirit and scope of the invention.

As used herein, a processor device corresponds to a central processing unit, a digital signal processing unit, some other type of processing unit, or a combination thereof. A memory device corresponds to a solid state drive, random access memory device, a hard disk drive, some other type of computer-readable storage device, or a combination thereof. A computer-readable storage device is an article of manufacture and is not a signal. A communications interface corresponds to a wired communications interface (e.g., a network interface card), a wireless communications interface (e.g., a wireless receiver, transmitter, transceiver, etc.), or a combination thereof configured to operate according to one or more communications standards to exchange messages with another device.

The system and method of the present invention can include operation by one or more processing devices, which can be any suitable device, such as a computer, processor, ASIC, microprocessor, or the like. The information may be stored on a data storage device, which can be located at or in communication with the processing device. The entire process is conducted automatically by the processing device, and without any manual interaction. Accordingly, unless indicated otherwise the process can occur substantially in real-time without any delays or manual action.

It is further noted that the present invention has been shown and described to form a large distributed satellite array in space to form a distributed antenna structure. However, the invention can be utilized for other applications, such as to form a mirror, telescope, solar energy collector, radar, or the like. And in one embodiment of the invention, the elements 100 are each about one square meter (1 m$^2$) and a few kilograms (perhaps 2-3 kg) in weight. There may be hundreds or thousands of elements 100, such that the storage configuration is a few square meters in size and the deployed configuration is about 400-500 m$^2$. Thus, the deployed configuration has an area that is many times (e.g., tens or hundreds of times) larger than the storage configuration.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A system comprising:
   a satellite assembly having a plurality of satellite devices, each satellite device of the plurality of satellite devices including:
      a processor device;
      an impulse actuator;
      an optical wireless interface to communicate with other satellite devices of the plurality of satellite devices; and
      a memory storing instructions executable by the processor device to move said plurality of satellite devices from a stored configuration to a deployed configuration by:
         accessing an entire sequence of waypoints, the entire sequence of waypoints comprising a stored waypoint corresponding to the stored configuration, to one or more intermediate waypoints, and to a target waypoint corresponding to the deployed configuration,
         wherein the entire sequence of waypoints is associated with formation of a distributed structure in the deployed configuration comprising the plurality of satellite devices, wherein in the deployed configuration, the target waypoints of at least two satellite devices of the plurality of satellite devices correspond to the respective optical wireless interfaces of the at least two satellite devices of the plurality of satellite devices being aligned with one another, thereby establishing an optical wireless network between the at least two satellite devices of the plurality of satellite devices,
         wherein in the storage configuration, the plurality of satellite devices are in a stacked relationship with respect to one another to form an initial stack of the plurality of satellite devices, and in the deployed configuration, the plurality of satellite devices form the distributed structure, and wherein the entire sequence of waypoints each comprise a specific location; and
         initiating movement of the respective satellite device from the stored waypoint toward the target waypoint by taking each topmost satellite device from the initial stack of the plurality of satellite devices sequentially from a top of the initial stack to a next available final location in a horizonal plane of the deployed configuration starting at an arbitrary location in a horizontal plane and working outward at least by initiating activation of the impulse actuator;
         wherein the entire sequence of waypoints are arranged such that the respective satellite device remains within a threshold distance of other satellite devices in the plurality of satellite devices while moving between each of the entire sequence of waypoints.

2. The system of claim 1, each satellite device of the plurality of satellite devices further having a coupling device that couples the satellite device to one or more neighboring satellite devices in a deployed position.

3. The system of claim 1, each optical wireless interface communicates with a central satellite.

4. The system of claim 1, wherein the entire sequence of waypoints is based on a linear control algorithm and ensures state stability, wherein the state stability includes position and velocity.

5. The system of claim 1, wherein the entire sequence of waypoints is based on a non-linear control algorithm and ensures state stability, wherein the state stability includes position and velocity.

6. The system of claim 1, wherein each waypoint in the entire sequence of waypoints corresponds to physical position of the satellite device relative to other satellite devices in the plurality of satellite devices.

7. The system of claim 1, further comprising a central satellite configured to instruct each of the plurality of satellite devices to begin traversing the corresponding sequence of waypoints.

8. The system of claim 1, wherein the instructions for each of the plurality of satellite devices to begin traversing the corresponding sequence of waypoints comprises instructing a first satellite device to being traversing a first sequence of waypoints and, responsive to determining that the first satellite device has completed traversing the first sequence of waypoints, instructing a second satellite device to begin traversing a second sequence of waypoints.

9. The system of claim 1, wherein the impulse actuator corresponds to a plurality of electric coils, and wherein activating the impulse actuator includes applying current to the plurality of electric coils.

10. The system of claim 9, wherein the instructions are further executable by the processor device to identify the one or more currents based on the Biot-Savart law.

11. The system of claim 9, wherein initiating movement of the satellite device toward the first waypoint further includes initiating transmission of a request to another satellite device of the plurality of satellite devices to apply one or more currents to one or more electric coils of the other satellite device.

12. The system of claim 9, wherein each of the plurality of electric coils of each satellite device of the plurality of satellite devices further is arranged at a right angle to each other of the plurality of the electric coils of the satellite device.

13. The system of claim 1, further comprising a communication interface configured to receive the entire sequence of waypoints at the same time.

14. The system of claim 1, wherein each satellite device of the plurality of satellite devices further comprises a location sensor, wherein the instructions are further executable by the processor device to:
 identify a current location of the satellite device based on data from the location sensor;
 predict a future location of the satellite device based on the current location;
 identify a new intermediate waypoint in response to determining that a distance between the future location and the first intermediate waypoint exceeds a tolerance;
 initiate transmission of a request to a central computer, the request identifying the new intermediate waypoint; and
 initiate movement of the satellite device toward the new intermediate waypoint at least by initiating activation of the impulse actuator based on receiving a confirmation message from the central computer.

15. The system of claim 14, wherein said processor device uses a linear control algorithm to identify the new intermediate waypoint and ensure state stability, wherein the state stability includes position and velocity.

16. The system of claim 14, wherein said processor device uses a non-linear control algorithm to identify the new intermediate waypoint and ensure state stability, wherein the state stability includes position and velocity.

17. The system of claim 14, wherein the entire sequence of waypoints is received from the central computer at the same time.

18. The system of claim 1, wherein the instructions are further executable by the processor device to initiate movement of the satellite device toward a next waypoint of the entire sequence of waypoints at least by activating the impulse actuator.

19. The system of claim 1, further comprising a storage container including the plurality of satellite devices, the plurality of satellite devices are stored in the storage container in the storage configuration.

20. The system of claim 19, wherein the plurality of satellite devices occupy substantially less area in the storage configuration than in the deployed configuration.

21. The system of claim 19, wherein the deployed configuration corresponds to a tetrahedron formation.

22. The system of claim 1, wherein the distributed structure corresponds to a phased-array antenna, mirror, telescope, solar energy collector, or radar.

23. A method comprising:
 accessing an entire sequence of waypoints at a satellite device, the entire sequence of waypoints including one or more intermediate waypoints and a target waypoint, wherein the entire sequence of waypoints is associated with formation of a distributed structure comprising the satellite device and a plurality of other satellite devices in a deployed configuration, wherein the entire sequence of waypoints are arranged such that the satellite device remains within a threshold distance of other satellite devices in the plurality of satellite devices while moving between each of the waypoints; and
 initiating movement of the satellite device from a stored configuration in an initial stack of the plurality of satellite devices toward the target waypoint successively via each of the intermediate waypoints by activating an impulse actuator of the satellite device, wherein a path of each satellite device in the initial stack is generated by
 (a) moving the respective satellite device up and off the top of the initial stack,
 (b) moving the respective satellite device horizontally in the direction of a final location of the respective satellite device until at a fixed distance away from the initial stack,
 (c) moving the respective satellite device down until within a fixed distance of a horizontal plane of the final location,
 (d) moving the respective satellite device horizontally in the direction of the final location until at fixed distance beyond the final location,
 (e) moving the respective satellite device down until at a vertical position of the respective satellite device is the same as that of the horizontal plane of the final location, and
 (f) moving the respective satellite device horizontally toward the final location of the respective satellite device,
 wherein in the deployed configuration, the plurality of satellite devices form the distributed structure, and wherein the entire sequence of waypoints each comprise a specific location, and wherein in the deployed configuration, the target waypoints of the satellite device and at least one of the other plurality of satellite devices correspond to respective optical wireless interfaces of the satellite device and the at least one of the other plurality of satellite devices being aligned with one another, thereby establishing an optical wireless network between the satellite devices.

24. A satellite system comprising:

a satellite assembly having a plurality of satellite devices, each satellite device of the plurality of satellite devices including:

a processing device accessing an entire sequence of waypoints including one or more intermediate waypoints and a target waypoint, wherein the entire sequence of waypoints is associated with formation of a distributed structure comprising the plurality of satellite devices in a deployed configuration, wherein the entire sequence of waypoints are arranged such that the respective satellite device remains within a threshold distance of the other satellite devices in the plurality of satellite devices while moving between each of the waypoints;

an impulse actuator comprising a plurality of electric coils, the plurality of electric coils of each satellite device being arranged at right angles to one another, wherein activating the impulse actuator includes applying current to the plurality of electric coils of each satellite device resulting in orthogonal magnetic fields in association with each satellite device; and said processing device initiating movement of the satellite device from a stored configuration toward the target waypoint by taking each topmost satellite device from an initial stack of the plurality of satellite devices sequentially from a top of the initial stack to a next available final location of the deployed configuration starting at an arbitrary location in a horizontal plane and working outward by activating said impulse actuator of the satellite device, wherein in the deployed configuration, the plurality of satellite devices form the distributed structure, and wherein the entire sequence of waypoints each comprise a specific location.

* * * * *